US 7,043,890 B2

(12) United States Patent
Lofton

(10) Patent No.: US 7,043,890 B2
(45) Date of Patent: May 16, 2006

(54) DECONTAMINATING LAWN VEHICLES AND TREE SHREDDERS

(76) Inventor: Travis Lofton, 613 Hamilton Ave., Lehigh Acres, FL (US) 33972-4532

( * ) Notice: Subject to any disclaimer, the term of this patent is extended or adjusted under 35 U.S.C. 154(b) by 45 days.

(21) Appl. No.: 10/775,267

(22) Filed: Feb. 10, 2004

(65) Prior Publication Data

US 2005/0172597 A1   Aug. 11, 2005

(51) Int. Cl.
   *A01C 15/00*   (2006.01)
(52) U.S. Cl. ...................................... 56/16.8
(58) Field of Classification Search ........ 56/16.4–16.8, 56/255, 295, 121, 15.2, 320.1, 320.2, DIG. 20; 239/172, 289, 165, 169, 175
See application file for complete search history.

(56) References Cited

U.S. PATENT DOCUMENTS

| 2,388,114 | A | 10/1945 | Boyce |
| 2,951,314 | A | 9/1960 | Laughlin |
| 3,019,470 | A | 2/1962 | Romeo |
| 3,140,574 | A | 7/1964 | Brown, Jr. |
| 3,247,655 | A | 4/1966 | Jacob |
| 3,534,533 | A | 10/1970 | Luoma |
| 3,648,446 | A | 3/1972 | Haapoja et al. |
| 3,977,605 | A | 8/1976 | Sheldon |
| 4,296,875 | A | 10/1981 | Borglum |
| 4,602,742 | A | 7/1986 | Penson |
| 4,771,822 | A | 9/1988 | Barbosa |
| 4,821,959 | A | 4/1989 | Browning |
| 5,190,218 | A | 3/1993 | Kayser et al. |
| 5,195,308 | A * | 3/1993 | Grote et al. ............. 56/16.4 R |
| 5,533,676 | A | 7/1996 | Conley |
| 6,138,770 | A | 10/2000 | Kayser |
| 6,374,586 | B1 * | 4/2002 | Burch ........................ 56/16.8 |
| 6,450,420 | B1 | 9/2002 | Gerber et al. |

* cited by examiner

*Primary Examiner*—Robert E Pezzuto
(74) *Attorney, Agent, or Firm*—Hahn Loeser & Parks LLP

(57) ABSTRACT

Novel lawn mowers and tree shredders or "chippers" designed to prevent the spread of agricultural pathogens, such as citrus canker, for example, are described and claimed herein. Exemplary embodiments of the mower comprise a storage tank containing chemical agent useful in eradicating agricultural pathogen, the tank connected to a series of nozzles arranged on the mower such that the mowing blades, lower frame of the mower, and housing guard, for example, are sprayed with the chemical agent. Embodiments of the "chipper" include one or more nozzles arranged within the hopper and/or the exit chute through which chemical agent may be sprayed onto foliage entering into the chipper and processed foliage exiting the chipper, respectively.

20 Claims, 4 Drawing Sheets

DECONTAMINATING LAWN VEHICLES AND TREE SHREDDERS

SUMMARY OF THE INVENTION

The present invention is directed to novel lawn equipment vehicles and tree shredders or "chippers" designed to decontaminate lawn and tree cuttings as well as the equipment, vehicles, and shredders themselves.

DETAILED DESCRIPTION OF THE PREFERRED EMBODIMENTS

Figure 1:
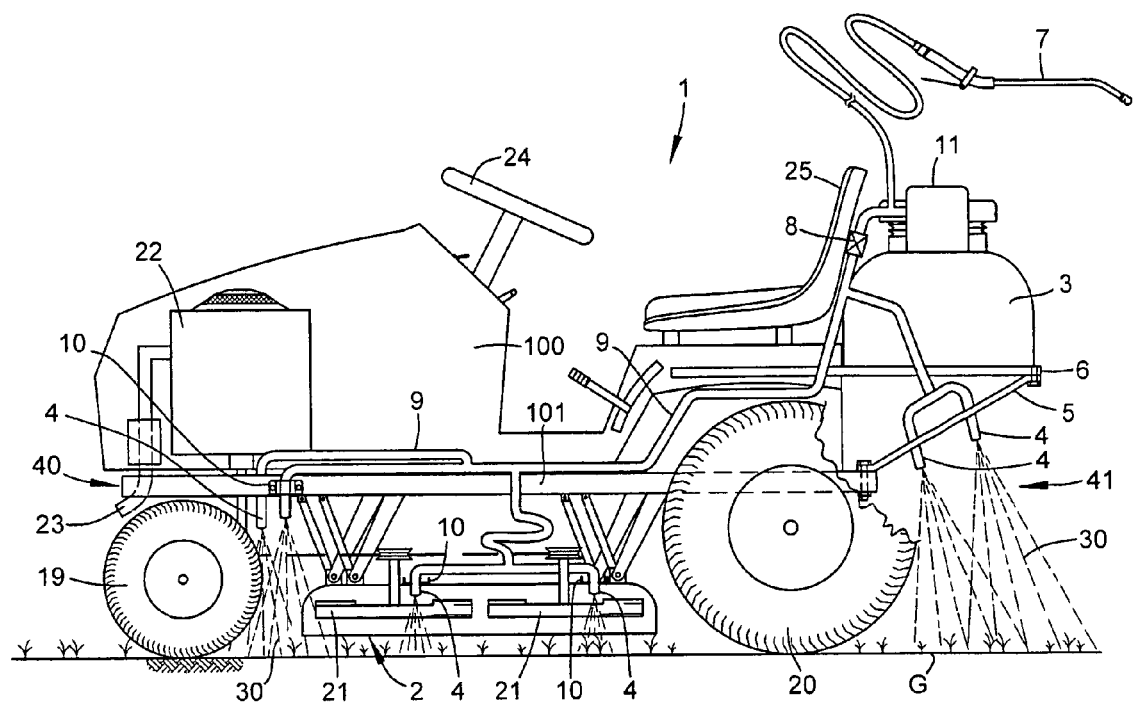
FIG. 1 is a side view of a lawn mower employing the present invention.
Figure 2:
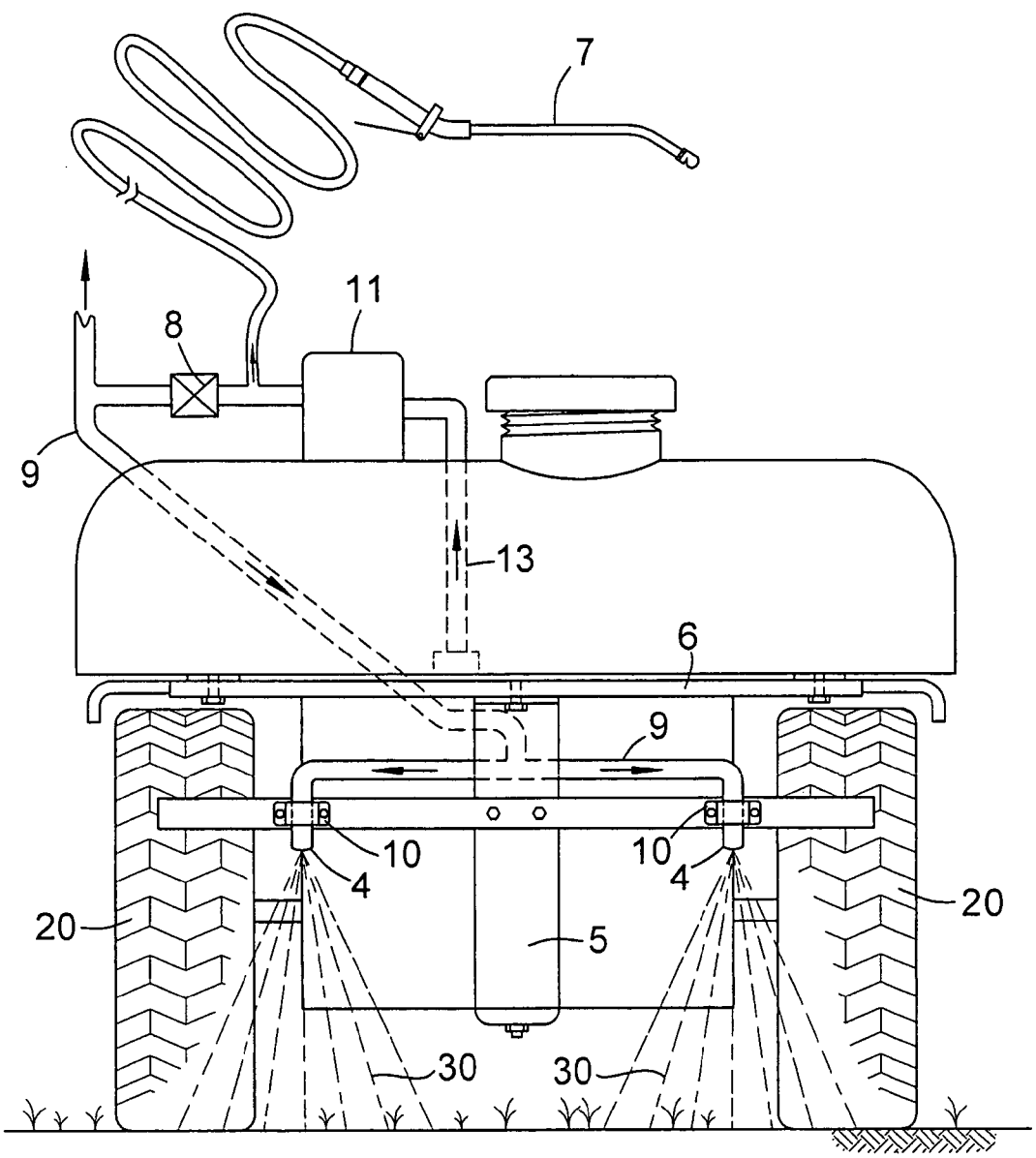
FIG. 2 is a rear view of the lawn mower illustrated in FIG. 1.
Figure 3:
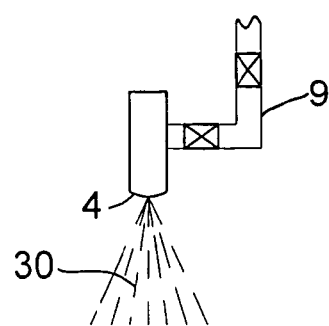
FIG. 3 is an enlarged side view of the nozzle and bracket assembly.
Figure 4:
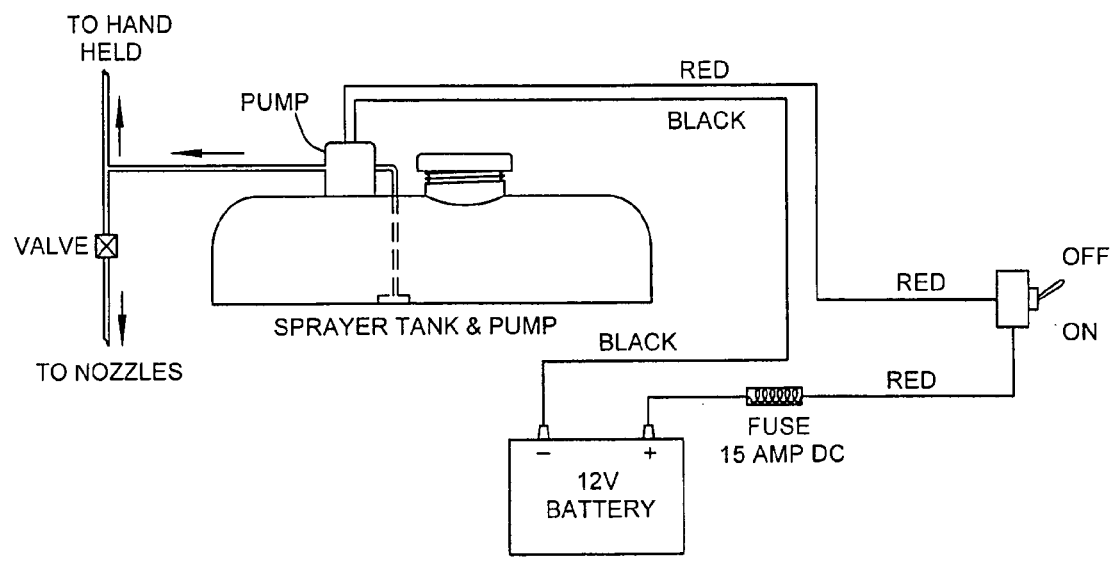
FIG. 4 is a schematic drawing of an exemplary wiring scheme between the power source and tank pump.

The present invention is directed to vehicles and equipment, namely lawn mowers and trees shredders, that are designed to decontaminate lawn and tree cuttings as well as the vehicles and equipment themselves from various agricultural pathogens, thereby preventing the spread of the pathogens to adjacent lawns. As used herein, "agricultural pathogens" include, but are not limited to, any variety of bacteria, fungi, parasites, insects, and the like that capable of causing agricultural diseases. Exemplary agricultural diseases include, but are not limited to, citrus canker.

Referring now to the figures, the present invention is directed in part to a vehicle, such as a lawn mower 1, that is designed to store and dispense a chemical agent onto the areas of the vehicle itself as well as the underlying lawn area. As used herein, "chemical agent" includes, but is not limited to, herbicides, bactericides, fungicides, and insecticides. The chemical agent is illustrated in the figures as a spray 30 exiting various nozzles 4, as discussed in more detail below. In a preferred embodiment, the chemical agent is substance suitable for eradicating citrus canker, which is particularly prevalent in Florida and other citrus growing states and countries.

The lawn mower 1 may be a conventional lawn mower, comprising a chassis 100, a lower frame 101, and a set of wheels 19, 20 secured to the front end 40 and rear end 41 of the lower frame. Like other lawn mowers, the inventive lawn mower includes an engine 22 connected to an exhaust pipe 23, a steering handle 24 for maneuvering the lawn mower, and preferably a seat 25 which the operator of the mower may sit upon while operating the lawn mower. The lawn mower includes a blade assembly or mower cutting deck secured to the lower frame of the chassis, the blade assembly comprising a set of cutting blades 21 disposed within a housing guard 2.

Mounted onto the lawn mower is a storage tank 3 for storing the chemical agent. The storage tank may be secured to a bracket portion 6 and support brace 5, that form a part of the chassis of the lawn mower. Alternatively, the bracket portion 6 and brace 5 may be removably attached to the chassis of the mower. The storage tank 3 has connected to it a pump 11 which, in turn, is connected to a hose or fluid line 9 used to carry the chemical agent. A series of nozzles 4 are secured to the lower frame of chassis at different points and are connected to the pump via the fluid lines. The nozzles may be secured to the chassis by one or more brackets 10, as shown. When the pump is activated (by an on-off switch for example), the chemical agent 30 is carried through the fluid lines 9 and through each nozzle 4. In order to decontaminate the cutting blades of the mower during operation, a set of nozzles are disposed within the housing guard 2 above and/or to the side of the cutting blades 21. When the pump 11 is activated, the chemical agent is pumped within the housing guard 2 to coat the inner surface of the housing guard as well as the cutting blades 21.

The lawn mower may further include a set of nozzles 4 disposed beneath the lower frame 101 just behind the front set of wheels 19 but in front of the housing guard 2. When the pump is activated, chemical agent 30 is carried through the fluid lines and through the nozzles to cover the lawn surface G being mowed. Optionally, a set of nozzles may be disposed about the sides and/or rear 41 of the chassis, such that upon activation of the pump, chemical agent may be sprayed along the ground. The pump employed with the present invention may be a DC 12 volt pump, for example, pumping at a pressure of at least 25 psi. Preferably, the nozzles employed in the present invention have a diameter sufficiently large to allow at least a 2-foot wide spray of chemical agent. It will be appreciated by those ordinary skill in the art, however, that the size and positioning of the nozzles within the housing guard and along the chassis of the lawn mower may be adjusted as desired, depending upon the size of the lawn mower, pump, and area to be mowed, for example. Moreover, the placement and means of attachment of the pump to the chassis is not critical to the invention, and thus, may be modified from that illustrated in the figures.

The invention may also include a hand-held wand 7 that allows the operator to spray chemical agent on surrounding plants and trees, for example. An optional shut-off valve 8 may be employed near the pump for activation by the operator of the vehicle without shutting off the pump, so that chemical agent may be re-routed to the hand-held wand 7 instead of the underlying nozzles 4 when the operator wishes to spray only the surrounding foliage with the chemical agent.

The inventive system is designed such that the lawn equipment, such as a lawn mower, for example, may be operated without necessarily activating the pump to spray chemical agent. As discussed above, an on-off switch may provided to activate the pump. In addition, the storage tank, pump, fluid line assembly, and nozzles may be installed on existing lawn mowers or similar lawn equipment, for example, without effecting the overall width of the equipment, the storage tank and pump, for example, preferably be mounted at the rear of the mower behind the seat.

Figure 5:
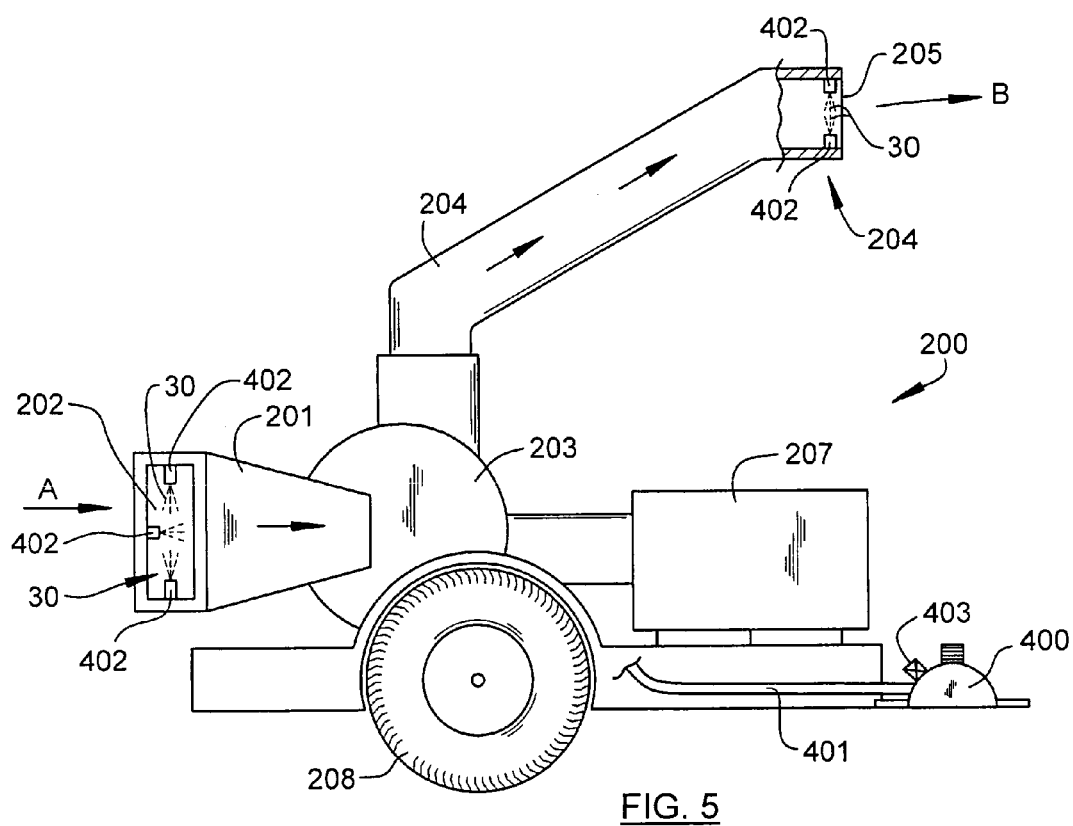
FIG. 5 is a side view of a shredding machine employing the present invention.

Referring now to FIG. 5, the present invention also includes a tree shredding machine or "chipper" 200. FIG. 5 is a simple schematic illustrating the hopper 201 wherein foliage, such as tree branches, leaves, shrubbery, and the like (not shown) are fed into the machine 200 through an open mouth 202 of the hopper 201 in the direction of arrow A. The open mouth 202 of the hopper 201 has a diameter sufficiently large to receive the foliage fed therein. The hopper is secured to a grinding blade assembly, referenced generally at 203 (the actual blades are not shown for ease of illustration, it being generally recognized by the skilled artisan that any blade assembly used in conventional chippers may be employed). The machine also has a powered vacuum assembly 207 to draw in the foliage fed through the hopper into the grinding blade assembly. As the foliage is fed into the machine and shredded, the resulting processed foliage is ejected through a chute 204 in the direction of the arrows and arrow B into a container or truck storage area (not shown) for subsequent disposal.

Secured within the open mouth 202 of the hopper 201 is at least one nozzle 402, which in turn, is secured to a fluid line assembly comprising one or more hoses 401 in communication with a storage tank 400. When the pump 403 on the storage tank is activated (by an on-off switch, for example), chemical agent contained in the tank is pumped therefrom, through the hoses nozzles 402, and onto the foliage being fed into the hopper. FIG. 5 illustrates a single hose 401 in communication with the storage tank 400; however, for ease of illustration, the specific connections to fluid lines and the actual nozzles 402 themselves are not shown, since it is understood by those of ordinary of skill in the art that the connecting means and the path of the fluid line assembly connection between the tank and nozzles may be achieved any number of ways.

Alternatively, or in addition to the nozzles 402 secured within the hopper 201, one or more nozzles 402 may be secured within the open mouth 205 of the exit chute 204 to spray chemical agent 30 onto the processed foliage exiting out of the machine 200. As described above for the lawn equipment, the chemical agent 30 may include, but is not limited to, herbicides, bactericides, fungicides, and insecticides. It will be recognized by those of ordinary skill in the art that the shredding machine illustrated in FIG. 5 is merely a schematic designed to show the main features of conventional shredders. For example, the embodiment in FIG. 5 includes a wheel 208 for aid in transporting the chipper. In addition, the storage tank 400 is shown mounted rearward of the chipper. Thus, it will be appreciated by the skilled artisan that a variety of shredding machine designs may be employed without departing from the spirit of the present invention provided the machine includes a means for applying the chemical agents described herein onto the foliage entering the hopper and/or existing the chute. The nozzles used to apply the chemical agent may be positioned in any manner within the machine, within the open mouth of the hopper, the open mouth of the chute, and/or at very places within the machine (not shown).

In all of the embodiments described and illustrated in the figures, the present invention is particularly useful in preventing the spread of vegetative pathogens by allowing for decontamination of the lawn equipment and shredding machines during operation as well as the lawn and foliage refuse created by the lawn equipment (e.g. grass cuttings generated by the lawn mower) and tree branches and other foliage shredded by the shredding machine.

The foregoing disclosure and description of the invention are illustrative and explanatory thereof, and various changes in the size and location of the components, the number of nozzles, and the design of the lawn equipment and shredding machine, for example, may be made without departing from the spirit of the invention.

I claim:

1. A motorized lawn mower comprising:
   a. a chassis having a lower frame, a rear end, and a front end;
   b. a first set of one or more wheels secured to said lower frame near said front end and a second set of one or more wheels secured to said lower frame near said rear end of said chassis;
   c. a storage tank for storing a chemical agent, said tank mounted onto said chassis, wherein said chemical agent is selected from the group of bactericides, pesticides, and herbicides;
   d. a blade assembly secured to said lower frame, said blade assembly including a housing guard and at least one cutting blade, the housing guard having a top surface and a bottom surface;
   e. at least one nozzle secured to said housing guard, said nozzle oriented such that said chemical agent flowing therethrough will contact said housing guard bottom surface and said at least one cutting blade during operation of said lawn mower;
   f. a motorized pump in communication with said storage tank; and
   g. at least one fluid line assembly having one end in communication with said pump and storage tank and another end secured to one or more of said nozzles, such that when said pump is activated, said chemical agent is pumped from said storage tank, through said at least one fluid line assembly, and discharged through said at least one nozzle.

2. The lawn mower of claim 1, further including a hand held spray attachment secured to said storage tank for spraying said chemical agent to surrounding vegetation, said spray attachment including a hose secured to, and in communication with, said storage tank, and a spray handle for operation by an operator of said lawn mower.

3. A motorized lawn mower comprising:
   a. a chassis having a lower frame, a rear end, and a front end, said chassis further having a steering handle for steering said lawn mower during operation;
   b. a first set of one or more wheels secured to said lower frame near said front end and a second set of one or more wheels secured to said lower frame near said rear end of said chassis;
   c. a storage container for storing a chemical agent, said tank mounted onto said chassis, wherein said chemical agent is selected from the group of bactericides, pesticides, and herbicides;
   d. a blade assembly secured to said lower frame, said blade assembly including a housing guard and at least one cutting blade, the housing guard having a top surface and a bottom surface;
   e. at least one nozzle secured to said housing guard, said nozzle oriented such that said fluid flowing therethrough will contact said housing guard bottom surface and said at least one cutting blade during operation of said lawn mower;
   f. at least one nozzle secured to said lower frame and positioned behind one of said pair of wheels, said nozzle oriented substantially perpendicular to said lower frame such that said fluid flowing therethrough will travel behind said first set of wheels to contact an underlying lawn;
   g. at least one fluid line assembly secured to, and in communication with, said storage tank and said at least one nozzles; and
   i. a motorized pump in communication with said storage tank, such that when said pump is activated, fluid is pumped from said storage tank, through said at least one fluid line assembly, and through said nozzles.

4. The lawn mower of claim 3, further including at least one nozzle secured to said rear end of said chassis.

5. The lawn mower of claim 3, further including a hand held spray attachment secured to said storage tank for spraying said chemical to surrounding foliage, said spray attachment including a hose secured to, and in communication with, said storage tank, and a spray handle for operation by an operator of said lawn mower.

6. A method of decontaminating a lawn mower from agricultural pathogens during operation of said lawn mower, thereby preventing the spread of said pathogens to adjacent lawns, said method comprising:
   a. operating the lawn mower of claim 1 to cut grass in a lawn area having citrus trees infected with, or suspected of being infected with, citrus canker, wherein said chemical agent is stored in said storage container of said lawn mower, said chemical agent effective in eradicating citrus canker pathogens; and
   b. activating the pump of said lawn mower during operation of said lawn mower to pump said chemical agent from said storage tank, through said fluid line assembly and at least one nozzle, and onto said underlying ground, said cutting blades, and said housing guard, thereby decontaminating concurrently said lower frame, said cutting blades, and said housing guard of said lawn mower to prevent the spread of said canker pathogens to other lawns upon subsequent operation of said lawn mowers on said other lawns.

7. The lawn mower of claim 2, wherein the hand held spray attachment further comprises a valve for stopping the flow of said chemical agent to said nozzles while providing the flow of said chemical agent to the hand held spray attachment.

8. A motorized shredding machine comprising:
   a. a grinding blade assembly for processing foliage fed into said machine, said foliage infected with, or suspected of being infected with, an agricultural pathogen;
   b. a hopper connected to said grinding blade assembly, said hopper comprising an open mouth end having a diameter sufficiently large to receive said foliage fed therein;
   c. a powered vacuum assembly for drawing said foliage fed into said hopper through said machine and into said grinding blade assembly, thereby creating processed foliage debris via said grinding blade assembly;
   d. an exit chute secured to said machine through which said processed foliage debris is discharged;
   e. a storage tank for storing a chemical agent, said tank mounted on said machine, wherein said chemical agent is selected from the group of bactericides, pesticides, and herbicides;
   f. at least one nozzle secured to said open mouth of said hopper;
   g. at least one fluid line assembly secured to, and in communication, with said storage tank and said at least one nozzle; and
   h. a motorized pump in communication with said storage tank and at least one fluid line assembly, such that when said pump is activated, said chemical agent is pumped from said storage tank, through said at least one fluid line assembly, and through said at least one nozzle to spray said foliage entering therein, thereby decontaminating said hopper and said foliage prior to processing, to thereby prevent further spread of said agricultural pathogens.

9. The shredding machine of claim 8, wherein said pathogen is citrus canker and said chemical agent is effective in eradicating citrus canker.

10. The shredding machine of claim 8, further including at least one second nozzle secured within said exit chute, said chute nozzle further in communication with a fluid assembly line and said pump and storage tank.

11. The shredding machine of claim 10, wherein said pathogen is citrus canker and said chemical agent is effective in eradicating citrus canker.

12. The shredding machine of claim 10, wherein said at least one second nozzle is secured near an open mouth of said exit chute.

13. The shredding machine of claim 8, further including one or more interior nozzles and fluid assembly lines in communication with said interior nozzles positioned within said machine at one or more locations within said machine between said open mouth of said chute and said open mouth of said hopper.

14. The shredding machine of claim 13, wherein said pathogen is citrus canker and said chemical agent is effective in eradicating citrus canker.

15. A motorized shredding machine comprising:
   a. a grinding blade assembly for processing foliage fed into said machine, said foliage infected with, or suspected of being infected with, an agricultural pathogen;
   b. a hopper connected to said grinding blade assembly, said hopper comprising an open mouth end having a diameter sufficiently large to receive said foliage fed therein;
   c. a powered vacuum assembly for drawing said foliage fed into said hopper through said machine and into said grinding blade assembly, thereby creating processed foliage debris via said grinding blade assembly;
   d. an exit chute secured to said machine through which said processed foliage debris is discharged;
   e. a storage tank for storing a chemical agent, said tank mounted on said machine, wherein said chemical agent is selected from the group of bactericides, pesticides, and herbicides;
   f. at least one nozzle secured to said exit chute of said machine;
   g. at least one fluid line assembly secured to, and in communication, with said storage tank and said at least one nozzle; and
   h. a motorized pump in communication with said storage tank and at least one fluid line assembly, such that when said pump is activated, said chemical agent is pumped from said storage tank, through said at least one fluid line assembly, and through said at least one nozzle to spray said processed foliage exiting therefrom, thereby decontaminating a portion of said exit chute and said processed foliage prior to exiting said machine, to thereby prevent further spread of said agricultural pathogens.

16. The shredding machine of claim 15, wherein said pathogen is citrus canker and said chemical agent is effective in eradicating citrus canker.

17. The shredding machine of claim 15, wherein said at least one nozzle is secured near an open mouth of said exit chute.

18. The shredding machine of claim 17, wherein said pathogen is citrus canker and said chemical agent is effective in eradicating citrus canker.

19. The shredding machine of claim 15, further including one or more interior nozzles positioned at one or more locations within said machine between said open mouth of said chute and said open mouth of said hopper.

20. The shredding machine of claim 19, wherein said pathogen is citrus canker and said chemical agent is effective in eradicating citrus canker.

* * * * *